United States Patent Office 2,766,232
Patented Oct. 9, 1956

2,766,232
1-ACYL-2,2-DIMETHYLETHYLENIMINES AND THEIR PYROLYSIS

Paul E. Fanta, Chicago, Ill.

No Drawing. Application July 27, 1955, Serial No. 524,810

7 Claims. (Cl. 260—239)

The present invention relates to ethylenimine derivatives, and is particularly concerned with 1-acyl-2,2-dimethylethylenimines and with methods for their pyrolytic conversion to N-acyl derivatives of methallylamine.

The 1-acyl-2,2-dimethylethylenimines of this invention can be represented by the structural formula $$\begin{array}{c} CH_3 \\ | \\ CH_3-C\underset{\underset{\underset{CO-\text{(lower) alkyl}}{|}}{N}}{\overset{}{\diagdown}}CH_2 \end{array}$$

wherein the lower alkyl radical can be methyl, ethyl, or straight- or branched-chain propyl, butyl, amyl, or hexyl.

N-acyl substitution products of various homologous ethylenimines are known in the prior art. Some of these, for example, have been described in U. S. Patent 2,339,046. Ring-opening and ring-expansion reactions of N-substituted ethylenimines, including N-acyl ethylenimines, have been extensively studied in earlier investigations, as a result of which it has been established that such derivatives, under conditions of pyrolysis or acid-catalysis, undergo predominantly either ring expansion or polymerization. Typical of such results is the finding of Gabriel and Stelzner, Berichte der Deutschen Chemischen Gesellschaft, 28, 2929 (1895) that pyrolysis of 1-benzoylethylenimine affords 2-phenyl-2-oxazoline, as well as the statement in U. S. Patent 2,339,046 that the N-acetyl ethylenimines described therein would polymerize at an elevated temperature. The pyrolytic ring-expansion and polymerization reactions of N-substituted ethylenimines are further discussed by Bestian, Annalen der Chemie, 566, 210 (1950).

I have now found that 1-acyl-2,2-dimethylethylenimines of the foregoing structural formula undergo pyrolytic transformations which are different in character from the pyrolytic transformations of homologous ethylenimine derivatives. Pyrolysis of the 1-acyl-2,2-dimethylethylenimines disclosed herein results in neither ring-expansion to an oxazoline nor polymerization, but instead unexpectedly results in isomerization to an N-acyl derivative of methallylamine having the structural formula $$\begin{array}{c} CH_3 \\ | \\ CH_2=C-CH_2NH-CO\text{-(lower) alkyl} \end{array}$$

For example, heating 1-acetyl-2,2-dimethylethylenimine for 5 minutes at 180° affords N-methallylacetamide in virtually quantitative yield, whereas similar treatment of the closely homologous 1-acetyl-2-methylethylenimine (the N,N-(alpha-beta-propylene)-acetamide of U. S. Patent 2,339,046) yields a complex mixture of products. The high boiling point range of the major portion of this mixture supports the view that pyrolysis of 1-acetyl-2-methylethylenimine affords chiefly polymeric products.

The 1-acyl-2,2-dimethylethylenimines of the foregoing structural formula can be prepared in good yield by acylation of 2,2-dimethylethylenimine under a variety of conditions. For example, 1-acetyl-2,2-dimethylethylenimine is formed when a stream of ketene is passed into cold 2,2-dimethylethylenimine. No solvent is required for this reaction. Another procedure for the manufacture of the 1-acyl-2,2-dimethylethylenimines is the treatment of a solution of 2,2-dimethylethylenimine in triethylamine and petroleum ether solution with an alkanoyl halide, suitably an alkanoyl chloride of the formula (Lower)alkyl-COCl In carrying out the pyrolytic processes of this invention, satisfactory results are obtained by heating the acyl derivatives at temperatures within the range of approximately 150–250° C. However, near the lower limit of this temperature range the isomerization reaction requires a somewhat longer time, so that a preferred method of operation is to heat the 1-acyl-2,2-dimethylethylenimine at a temperature in the range of 180–220° C. Under these conditions the isomerization proceeds smoothly and is complete within a few minutes. The progress of the isomerization can be followed and its completion demonstrated in either of two convenient ways. As the reaction proceeds, the refractive index of the mixture gradually increases until it becomes constant at a maximum at the end of the reaction. If the isomerization is carried out at the reflux temperature, which is another suitable method of conducting the reaction, the reflux temperature gradually increases until it becomes constant at a maximum at the end of the reaction. The most satisfactory results are obtained by avoiding unnecessary or excessive heating after the completion of the desired isomerization.

In another useful modification, the acylation and isomerization can be carried out as a single operation. This result is achieved, for example, by conducting an acetylation of 2,2-dimethylethylenimine with isopropenyl acetate in a pressure vessel at about 200–210° C. At this temperature, the N-acetyl derivative is immediately isomerized as it is formed, and N-methallylacetamide results directly.

The N-acyl substitution products of methallylamine which result from pyrolytic processes described herein are useful as monomers for copolymerization with compounds such as vinyl acetate and styrene, as described in U. S. Patent 2,592,218. Alkaline hydrolysis of an N-acyl methallylamine affords methallylamine, which is a valuable reagent for organic syntheses. For example, it can be converted into methallylurea by the procedure of Papesch and Schroeder, Journal of Organic Chemistry, 16, 1887 (1951). As described in U. S. Patent 2,650,922, methallylurea is an intermediate in the manufacture of the potent diuretic agent 1-methallyl-3-methyl-6-amino-1,2,3,4-tetrahydro-2,4-pyrimidinedione.

This invention will appear more fully from the examples which follow. These examples are set forth by way of illustration only, and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade (° C.), quantities of materials in parts by weight, and pressures in millimeters (mm.) of mercury. The values given for refractive indices are those determined at 25° C. with light having the wavelength of the D line of sodium.

Example 1

A reaction flask containing 142 parts of 2,2-dimethylethylenimine is cooled in a solid carbon dioxide-acetone bath, and a stream of ketene is introduced into the flask until the gain in weight amounts to approximately 82 parts. Distillation of the reaction mixture under reduced pressure affords 1-acetyl-2,2-dimethylethylenimine boiling at 61–62.5° C. at 22 mm. and having a refractive index of 1.4324. This compound has the structural formula:

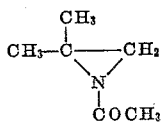

Example 2

Ten parts of 1-acetyl-2,2-dimethylethylenimine is heated at atmospheric pressure to the reflux temperature. The contents of the reaction vessel begin to boil vigorously at a bath temperature of about 180° C., but the boiling quickly subsides, and the isomerization is complete within a few minutes. At the completion of the reaction, the reflux temperature is approximately 228° C. Distillation under reduced pressure affords a virtually quantitative yield of N-methallylacetamide boiling at 113° C. at 9 mm. and having a refractive index of 1.4590. This compound has the structural formula

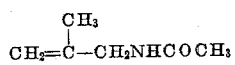

Example 3

A stainless steel reaction vessel containing 60 parts of sodium hydroxide, 60 parts of water and 67 parts of diethylene glycol is heated to the boiling point of the mixture, and a mixture of 113 parts of N-methallylacetamide and 60 parts of water is introduced gradually over a period of 30 minutes. Throughout this period of addition, a distillate is continuously removed from the reaction vessel through a short fractionating column, and the distillation is continued until about 150 parts of distillate has been collected. The distillate is stirred with 30 parts of sodium hydroxide, and when this has dissolved, the non-aqueous phase is separated, dried over solid sodium hydroxide, and distilled. In this manner there is obtained methallylamine boiling at approximately 77–82° C. and having a refractive index of 1.4286.

Example 4

A solution of 35.5 parts of 2,2-dimethylethylenimine, 55.5 parts of triethylamine and 130 parts of petroleum ether is stirred and maintained at a temperature of about 5–20° C. during the addition of a solution of 46.2 parts of propionyl chloride in 10 parts of petroleum ether. The propionyl chloride solution is added over a period of about 45 minutes, during which time a white precipitate of triethylamine hydrochloride forms in the reaction mixture. An additional 65 parts of petroleum ether is also added gradually, to facilitate stirring. The reaction mixture is filtered, and the filtrate, combined with petroleum ether washings, is heated at 60° C. at a pressure of 20 mm. to remove volatile solvents. When the residue is subjected to a vacuum distillation, 1-propionyl-2,2-dimethylethylenimine is obtained. This compound boils at 74–78° C. at 20 mm. and has a refractive index of 1.4350.

Example 5

Ten parts of 1-propionyl-2,2-dimethylethylenimine is heated at atmospheric pressure to the reflux temperature, and maintained under reflux for a period of 5 minutes. During this period the reflux temperature rises from about 178° C. to 237° C. At the end of this time the isomerization is complete, and the product is N-methallylpropionamide having a refractive index of 1.4670. Alkaline saponification of this product by the method of Example 3 yields methallylamine.

Example 6

By the procedure of Example 4, with the substitution of 53.2 parts of butyryl chloride for the propionyl chloride, there is obtained 1-butyryl-2,2-dimethylethylenimine. Pyrolysis of this product by heating it at the reflux temperature for 5 minutes yields N-methallylbutyramide. This is converted into methallylamine by alkaline hydrolysis according to the method of Example 3.

Example 7

A mixture of 35.5 parts of 2,2-dimethylethylenimine and 55 parts of isopropenyl acetate is heated in a pressure vessel at about 200–210° C. for 30 minutes. In this manner the acetylation and isomerization steps are conducted as a single operation. The contents of the reaction vessel are then cooled and distilled under reduced pressure, affording N-methallylacetamide, identical with the product of Example 2.

What is claimed is:

1. A 1-acyl-2,2-dimethylethylenimine of the structural formula

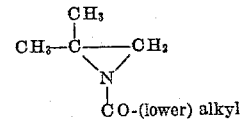

2. 1-acetyl-2,2-dimethylethylenimine.
3. 1-propionyl-2,2-dimethylethylenimine.
4. A process which comprises heating a 1-acyl-2,2-dimethylethylenimine of the structural formula

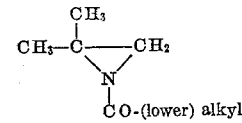

at a temperature higher than 150° C. and isolating an N-acyl methallylamine of the structural formula

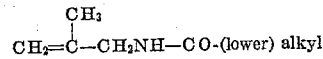

5. A process which comprises heating 1-acetyl-2,2-dimethylethylenimine at a temperature higher than 150° C. until its conversion to N-methallylacetamide is substantially complete.

6. A process which comprises heating 1-propionyl-2,2-dimethylethylenimine at a temperature higher than 150° C. until its conversion to N-methallylpropionamide is substantially complete.

7. A process which comprises heating a mixture of 2,2-dimethylethylenimine and isopropenyl acetate under superatmospheric pressure at a temperature higher than 150° C. and isolating N-methallylacetamide from the product.

References Cited in the file of this patent

UNITED STATES PATENTS

| | | |
|---|---|---|
| 2,339,046 | Bestian | Jan. 11, 1944 |
| 2,596,200 | Bestian | May 13, 1952 |